US008970329B2

(12) United States Patent
Fisher et al.

(10) Patent No.: US 8,970,329 B2
(45) Date of Patent: Mar. 3, 2015

(54) COMPONENT HAVING A MULTIPACTOR-INHIBITING CARBON NANOFILM THEREON, APPARATUS INCLUDING THE COMPONENT, AND METHODS OF MANUFACTURING AND USING THE COMPONENT

(75) Inventors: Patrick J. Fisher, Pittsburgh, PA (US); Walter J. Keller, III, Bridgeville, PA (US)

(73) Assignee: Nokomis, Inc., Charleroi, PA (US)

( * ) Notice: Subject to any disclaimer, the term of this patent is extended or adjusted under 35 U.S.C. 154(b) by 356 days.

(21) Appl. No.: 13/339,070

(22) Filed: Dec. 28, 2011

(65) Prior Publication Data

US 2013/0033343 A1 Feb. 7, 2013

Related U.S. Application Data

(60) Provisional application No. 61/574,532, filed on Aug. 4, 2011.

(51) Int. Cl.

| | |
|---|---|
| ***H01P 1/08*** | (2006.01) |
| ***H01J 25/76*** | (2006.01) |
| ***H01J 9/02*** | (2006.01) |
| ***B82Y 99/00*** | (2011.01) |
| ***H01J 23/12*** | (2006.01) |
| ***H01J 23/36*** | (2006.01) |
| *B82Y 30/00* | (2011.01) |
| *B82Y 40/00* | (2011.01) |

(52) U.S. Cl.

CPC ................ *H01J 23/12* (2013.01); *H01J 23/36* (2013.01); *H01P 1/08* (2013.01); *B82Y 30/00* (2013.01); *B82Y 40/00* (2013.01)

USPC ..................................... 333/252; 333/99 MP

(58) Field of Classification Search

USPC ........................................... 333/252, 99 MP

See application file for complete search history.

(56) References Cited

U.S. PATENT DOCUMENTS

| | | | |
|---|---|---|---|
| 4,151,325 | A | 4/1979 | Welch |
| 6,132,551 | A | 10/2000 | Horioka et al. |
| 7,012,386 | B1 | 3/2006 | Berg et al. |
| 7,417,376 | B2 | 8/2008 | Aitken |
| 7,623,004 | B2 | 11/2009 | Wolk et al. |
| 2007/0079936 | A1 | 4/2007 | Li et al. |

OTHER PUBLICATIONS

Sounas et al., Gyrotropic Properties of Graphene and subsequent microwave applications, 2011 41st European Microwave Conference (EuMC), Oct. 2011, pp. 1142-1145.*

Liang et al., Terahertz metal nanofilm waveguides, 2011 International Conference on Electronics and Optoelectronics (ICEOE), Jul. 2011, pp. V2-132-V2-135.*

(Continued)

*Primary Examiner* — Stephen Jones
*Assistant Examiner* — Scott S Outten
(74) *Attorney, Agent, or Firm* — The Webb Law Firm

(57) ABSTRACT

A high power RF energy device component is disclosed that is exposed to high power RF energy in a vacuum environment, and includes a multipactor-inhibiting carbon nanofilm covering at least one surface of the component. A secondary electron emission (SEE) coefficient of the multipactor inhibiting carbon nanofilm is desirably less than a SEE coefficient of the underlying surface of the component.

102 Claims, 3 Drawing Sheets

20
24
27
26
28
22
2
5
4
3
1

(56) References Cited

OTHER PUBLICATIONS

Sounas et al., Field Displacement in a Graphene loaded waveguide, 2011 10th International Conference on Telecommunication in Modern Satellite Cable and Broadcasting Services (TELSIKS), Oct. 2011, pp. 25-26.*
Wu, Asymptotic Expressions for guided TM and TE waves in graphene parallel-plate waveguide, 2011 International Conference on Electromagnetics in Advanced Applications (ICEAA), Sep. 2011, pp. 460-463.*
Ruzic et al., "Secondary Electron Yields of Carbon-Coated and Polished Stainless Steel", J Vac. Sch. and Technol.,20(4) 1313-1316 (1982).
Farhang et al., "Electron backscattering and secondary electron emission from carbon targets: comparison of experimental results with Monte Carlo simulations", J Phys. D: Appl. Phys 26/2266 (1993).
He et al., "Secondary Electron Emission Measurements for TiN Coating on the Stainless Steel of SNS Accumulator Ring Vacuum Chamber", Proceedings of the 2004 EPAC, 1804 (2004).
Suharyanto et al., "Secondary electron emission and surface charging evaluation of alumina ceramics and sapphire", IEEE Trans. Dielec. Elec. Ins., 13(1) 72-78 (2006).
Matsumoto et al., "A New Design for a Super-Conducting Cavity Input Coupler", Proceedings of the 2nd Annual Meeting of Particle Accelerator Society of Japan and the 30th Linear Accelerator Meeting in Japan, 197-199 (2005).
Primdahl et al., "Reduction of multipactor in RF ceramic windows using a simple titanium-vapor deposition system," Proceedings of the 1995 Pmticle Accelerator Conference, 3 (1687-1689) (1995).
Sun et al., "Epitaxial Growth of SiC on Complex Subtrates," J Crystal Growth, 227-228; 811-815 (2001).
Radiology Info: Retrieved From: http://radiologyinfm.orglenlinfo.cfin?pg=linac.
Kim et al., "Transition of window breakdown from vacuum multipactor discharge to rf plasma" Physics of Plasmas, 13 123506 (2006).
Diaz et al., "Materials of Low Secondary Electron Emission to Prevent the Multipactor Effect in High-Power RF Devices in Space", Proc, 6th Space. Char. Tech. Con. AFRL-VS-TR-20001578 (2001).
Isagawa et al., "Coating Techniques and Improvement of High Power CW Klystrons for TRISTAN" Proceedings of the 1994 EPAC, 1912 (1994).
Rollings et al., "Synthesis and characterization of atomically thin graphite films on a silicon carbide substrate," J. Phys. Chem. Sol. 67 (2172-2177) (2006).
Emtsev et al., "Towards wafer-size graphene layers by atmospheric pressure graphitization of silicon carbide," Nature Materials, 8: 203-207 (2009).
Eda et al., "Large-area ultrathin films of reduced grapheme oxide as a transparent and flexible electronic material," Nature Nanotechnology, 3: 270-274 (2008).
Sywe et al., "Epitaxial Growth of SiC on Sapphire Substrates with an AIN Buffer Layer," J Electrochem. Soc., 141: 510-513 (1994).
Mansurov et al., "AIN Growth on Sapphire Substrate by Ammonia MBE," J Crystal Growth, 300: 145-150 (2007).
Okamoto et al., "Epitaxial Growth of AIN Thin Films on Sapphire by Pulsed Laser Deposition and Effect of N2 Ambient on Crystallinity," Jpn, J Appl, Phys., 38: 2114-2115 (1999).
Malouf, "Analysis and Testing for Assessing Risk of Occurrence of Multipactor in Two Telecommunications Components of the STEREO Spacecraft," Proceedings of the 4th International Workshop on Multipactor, Corona and Passive Intermodulation in Space RF Hardware (2003), available at: http://conferences.esa.int/03C26lindex.html.
Vicente, et al. "FEST3D-a simulation tool for multipactor prediction" 5th International Workshop on Multipactor, Corona and Passive Intermodulation in Space RF Hardware MULCOPIM (2005), p. 11-17.
Suarez et al., "A titanium nitride coating tested in passive intermodulation," Proceedings of the 4th International Workshop on Multipactor, Corona and Passive Intermodulation in Space RF Hardware (2003), available at: http://conferences.esa.int/03C26/inex.html.
Li et al., "Large-Area Synthesis of High-Quality and Uniform Graphene Films on Copper Foils," Science, 324: 1312-1314 (2009).
Bornemann et al., "Efficient full-wave CAD of waveguide diplexers," ANTEM 1996: Conference and Workshop on Computational Electromagnetics and Antennas. (1996).
Amari et al., "Diplexer design using pre-synthesized waveguide filters with strongly dispersive inverters," IEEE Microwave Theory and Techniques Society International Microwave Symposium Digest, 1 (2001) 1627-1630.
"Multipaction Design and Test", ECSS Secretariat: ECSS-E-20-01A, ESA-ESTEC May 5, 2003.
Hatch et al., "Multipacting modes of high-frequency gaseous breakdown," Physical Review, 112: 681-685 (1958).
Rimmer et al., "A High-Power L-Band RF Window" U.S. Department of Energy. Particle Accelerator Conference, 2001. PAC 2001. Available at: http://library.lanl.gov/cgi-bin/getfile?00818357.pdf.
Kaabi et al., "Titanium Nitride Coating as a Multipactor Suppressor on Recoupler Ceramic Windows", Proceedings of PAC09, Vancouver, BC, Canada (2009).
Song et al., "Multipacting Study of the RF Window at the Advanced Photon Source", Proceedings of the 1999 Particle Accelerator Conference, New York, (1999).
Fisher et al., "Thickness Monitoring of Graphene on SiC using Low-Energy Electron Diffraction", J. Vac. Sci. Technol. A 28, 958 (2010).
Luxmi et al., "Formation of Epitaxial Graphene on SiC(0001) Using Vacuum or Argon Environments", J. Vac. Sci. Technol. B 28, C5C1 (2010).
Gu et al. "The influence of the band structure of epitaxial graphene on SiC on the transistor characteristics", Solid State Comm. 149, 2194 (2009).
Luxmi et al., "Morphology of Graphene on SiC(0001) Surfaces" Appl. Phys. Lett. 95, 073101 (2009).
Calizo et al. "Graphene-on-Sapphire and Graphene-on-Glass: Raman Spectroscopy Study." arXiv preprint arXiv:07102369 (2007).
Variola et al., "Titanium Nitride Coating of RF Ceramic Windows by Reactive DC Magnetron Sputtering", 11th European Particle Accelerator Conference "EPAC'08" (2008).
Kishek et al., "Multipactor Discharge on Metals and Dielectrics: Historical Review and Recent Theories", Physics of Plasmas. 5(5); 2120-2126. (1998).
Neubauer et al., "High-Power Rf Window and Coupler Development for the PEP-II B Factory", 16th IEEE Particle Accelerator Conference: Dallas, Texas (1995).
Schultheiss et al., "RF, Thermal and Structural Analysis of a High-Power CW RF Window", XX International Linac Conference, Monterey, California (2000).
Sharma et al., "Development of Multi-Channel High Power Rectangular RF Window for LHCD System Employing High Temperature Vacuum Brazing Technique", Journal of Physics: Conference Series 208(2010) 012024.
Michizono et al., "Development of C-Band High-Power Mix-Mode RF Window", Proceedings of LINAC 2004, Lubeck, Germany.
Fowkes et al., "Design Considerations for Very High Power RF Windows at X-Band", 19th International Linear Accelerator Conference, Chicago, Illinois, Aug. 23-28, 1998.
Ruzic et al., Secondary Electron Yields of Carbon-Coated Polished Stainless Steel. Princeton, New Jersey (1982).
Saito et al., "Surface Breakdown Phenomena in Alumina RF Windows", Dielectrics and Electrical Insulation, IEEE Transactions on: 2(2): 243-250 (1995).
Saito et al., "Surface Flashover on Alumina RF Windows for High-Power Use", Electrical Insulation, IEEE Transactions on: 28(4): 566-573 (1993).

* cited by examiner

COMPONENT HAVING A MULTIPACTOR-INHIBITING CARBON NANOFILM THEREON, APPARATUS INCLUDING THE COMPONENT, AND METHODS OF MANUFACTURING AND USING THE COMPONENT

CROSS REFERENCE TO RELATED APPLICATIONS

This application is based upon U.S. Provisional Patent Application No. 61/574,532 entitled "Structure for Inhibiting Multipactor in RF Devices and Method for Preparing the Same", filed Aug. 4, 2011, which is hereby incorporated by reference for all purposes as if set forth herein.

BACKGROUND OF THE INVENTION

1. Field of the Invention

The present invention relates to components having multipactor-inhibiting coatings for use in any circumstances where the phenomenon of multipactor flashover occurs. For example, such components may be provided to high power RF energy devices, such as plasma sources, microwave devices, particle accelerating devices that generate high power, low frequency energy corresponding to radio frequency, microwave, or millimeter wavelengths, and that require an isolated vacuum environment in order to operate. These components may be components of klystrons, Inductive Output Tubes (IOTs), linear accelerators, magnetrons, RF amplifiers, UHF television transmitters, Traveling Wave Tube Amplifiers (TWTAs or TWTs), particle accelerators, triodes, radiotherapy devices, Free Electron Lasers (FELs), Backward Wave Oscillators (BWOs), ion accelerators, plasma devices, relativistic diffraction generators, RF transmitters, satellite systems, RF communication equipment, or other high power energy devices that generate or propagate energy corresponding to radio frequency, microwave, or millimeter wavelengths. These coated components may also be used in circumstances where the phenomenon of multipactor flashover does not occur but where it is desirable to selectively transmit electromagnetic energy at some frequencies while blocking or inhibiting transmission of other frequencies.

2. Description of Related Art

Multipactor flashover is a phenomenon that occurs in high power RF energy devices, wherein secondary electron emission in resonance with an electric field leads to exponential secondary electron multiplication resulting in an avalanche of electrons that damages or destroys components of the high power RF energy devices. The cause of this phenomenon involves high second electron emission (SEE) coefficients of the surfaces of the components that are exposed to the high power RF energy in the vacuum environment.

Waveguides of high power RF energy devices are components that may suffer from multipactor flashover. Common materials used in these waveguides include copper, silver, gold, and ALODINE, and high power devices commonly utilize oxygen-free copper with silver or gold plating. These materials are well-suited for waveguide applications based on RF response, but these materials share a major drawback: an unacceptably high secondary electron emission coefficient resulting in multipactor flashover events at relatively low field strengths. Diplexer components in satellite RF devices are a bottleneck due to their high rates of multipactor failure and, therefore, decrease overall performance. Recent research to address this problem includes simulation methodologies, new component test procedures, surface geometry modifications, and new processing techniques for multipactor mitigation coatings and other materials.

RF windows are components that also may suffer from multipactor flashover. Alumina is conventionally used for these RF windows. However, as a standalone material, alumina has an unacceptably high SEE coefficient resulting in multipactor flashover events at relatively low powers. One conventional option for improving the SEE coefficient of alumina RF windows is to coat the RF window with titanium nitride TiN, which has a lower SEE coefficient than alumina. However, TiN coatings can become chemically unstable upon exposure to air and are, therefore, unsuitable for many applications, such as space applications. Moreover, even if chemical exposure of the TiN coating is prevented, the improvement resulting from the TiN coating is limited. For a thin TiN coating, the danger of a multipactor flashover exists and, although a thick TiN coating will inhibit multipactor flashover, it fails due to overheating as a result of RF absorption. Recent research to address those deficiencies has focused on modeling the multipactor effect, optimizing the structure of the alumina dielectric, improving the processing of the TiN coatings, and replacing TiN with alternative materials.

With respect to improving the processing of the TiN coatings, it has been observed that the processing parameters for TiN significantly affect the resulting properties, and so some work has studied process optimization of TiN film growth. It has been found that argon ion assistance, or an optimized $N_2$/argon mix during deposition, can lead to improved performance of the TiN coating during operation.

Also, AQUADOG, a water-based colloidal graphite suspension that was patented in the 1970s has been used for coatings in applications such as cathode ray tubes, and there has been some research in terms of publications and patents relating to diamond-like carbon coatings for these applications. However, diamond-like carbon coatings have not shown sufficient improvement in RF window properties.

Graphene is currently a major topic of research for semiconductor and other electrical applications. In some ways, graphene has comparable electrical properties to carbon nanotubes. Yet, graphene lends itself to lithographic processing techniques in a manner that leads to a more natural integration with current wafer processing technology and practices. Thus, the majority of graphene research is currently focused either on its semiconductor potential (while on its own graphene is a conductor, a number of different methods can induce the formation of gaps into its band structure) or the unique physics of graphene systems. For wafer-scale graphene, the most significant current method of graphene production is high temperature decomposition of silicon carbide. In this method, a SiC wafer is placed in a vacuum chamber where it may be hydrogen etched to produce a high-quality surface. Then the SiC wafer is annealed, either in a vacuum or in a controlled atmosphere, until the silicon on the surface desorbs, leaving behind an excess of carbon which then crystallizes into graphene using the SiC substrate as a template.

SiC has two geometrically different basal plane faces; the (0001) and the (1001), known as the 'Si' and 'C' faces, respectively. These two faces behave very differently during graphitization (with the faces maintaining their differing behaviors for different polytypes). In general, graphitization on the Si-face requires higher temperatures (1200-1300° C.) and results in the self-limited growth of three to five monolayers of graphene, whereas growth on the C-face begins around 150° C. cooler and can achieve thicknesses of 10 nm or more. Also, C-face growth results in a notably rougher morphology than Si-face growth, and both surfaces fail to yield uniform graphene films under all vacuum annealing conditions.

It has been suggested that in a vacuum, the rate at which Si sublimates (leaving behind excess C) always exceeds the rate at which the carbon mobility allows the graphene film to incorporate it, resulting in non-uniform graphene. Several methods to flip this problematic inequality have been tested with success: graphitization in a near-atmosphere argon environment, where the argon assumptively limits Si desorption simply by physical reflection; and graphitization under an incident Si molecular beam, where the desorption rate is countered by a significant absorption, and graphitization in a silane/disilane environment. Graphitization in these environments requires higher temperatures, but results in improved graphene crystallinity with larger domains In addition to graphitization of SiC, research has been conducted on coating graphene onto metals as well as on depositing graphene from solution for incorporation into large-area electronics.

SUMMARY OF THE INVENTION

A high power RF energy device component of the present invention includes a multipactor-inhibiting carbon nanofilm covering at least one surface of the component, wherein a secondary electron emission (SEE) coefficient of the multipactor inhibiting carbon nanofilm is less than a SEE coefficient of the underlying surface of the component. The SEE coefficient of the multipactor inhibiting carbon nanofilm may be less than a SEE coefficient of conventional multipactor-inhibiting TiN coatings.

A thickness of the multipactor inhibiting carbon nanofilm may be between 0.142 nm and 14.2 nm thick.

The multipactor inhibiting carbon nanofilm may include graphene. The graphene may include a plurality of parallel $sp^2$ hybridized carbon sheets.

The carbon nanofilm may include Electron Beam Deposited Carbonaceous Layers (EBDCL).

The surface of the component may be a metal surface. The metal may be formed of copper, silver, or gold, which may be copper plated with silver or gold.

The component may be a waveguide comprising at least one surface defining at least one cavity through which high power RF energy is guided, wherein the multipactor-inhibiting carbon nanofilm covers the at least one surface of the waveguide.

The surface of the component may be formed of a ceramic material. The ceramic material may include a metal oxide material. The metal oxide material may be alumina, such as single crystalline sapphire or polycrystalline alumina.

The ceramic material may include a metal nitride material, such as aluminum nitride.

The ceramic material may include a carbide compound, such as silicon carbide.

The component may be an RF window comprising a microwave transparent material for separating a vacuum environment and a surrounding environment, wherein the multipactor-inhibiting carbon nanofilm covers at least the surface of the microwave transparent material facing the vacuum environment.

An RF window for high power RF energy devices of the present invention includes a microwave transparent material for separating a vacuum environment and a surrounding environment, and a multipactor-inhibiting carbon nanofilm covering at least the surface of the microwave transparent material that faces the vacuum environment, wherein a secondary electron emission (SEE) coefficient of the multipactor inhibiting carbon nanofilm is less than a SEE coefficient of the microwave transparent material. The SEE coefficient of the multipactor inhibiting carbon nanofilm may be less than a SEE coefficient of conventional multipactor-inhibiting TiN coatings.

A thickness of the multipactor inhibiting carbon nanofilm may be between 0.142 nm and 14.2 nm thick.

The multipactor inhibiting carbon nanofilm may include graphene. The graphene may include a plurality of parallel $sp^2$ hybridized carbon sheets.

The carbon nanofilm may include Electron Beam Deposited Carbonaceous Layers (EBDCL).

The microwave transparent material may be formed of a ceramic material, such as a metal oxide material. The metal oxide material may be alumina, such as single crystalline sapphire or polycrystalline alumina.

The RF may further comprise an intermediate layer between the microwave transparent material and the multipactor inhibiting carbon nanofilm. The intermediate layer may include a ceramic material, such as a metal nitride or a carbide compound. The metal nitride may be MN. The carbide compound may be SiC.

A waveguide for a high power RF energy device of the present invention includes at least one surface defining at least one cavity through which high power RF energy is guided, and a multipactor-inhibiting carbon nanofilm covering the at least one surface of the waveguide, wherein a secondary electron emission (SEE) coefficient of the multipactor inhibiting carbon nanofilm is less than a SEE coefficient of the at least one surface of the waveguide. The SEE coefficient of the multipactor inhibiting carbon nanofilm may be less than a SEE coefficient of conventional multipactor-inhibiting TiN coatings.

A thickness of the multipactor inhibiting carbon nanofilm may be between 0.142 nm and 14.2 nm thick.

The multipactor inhibiting carbon nanofilm may include graphene. The graphene may include a plurality of parallel $sp^2$ hybridized carbon sheets.

The carbon nanofilm may include Electron Beam Deposited Carbonaceous Layers (EBDCL).

The surface of the waveguide may be a metal surface. The metal may be formed of copper, silver, or gold, such as copper plated with silver or gold.

The waveguide may be a diplexer or may be an output multiplexer.

A method of manufacturing a high power RF energy device component that is exposed to high power RF energy in a vacuum environment of the present invention includes forming a multipactor-inhibiting carbon nanofilm covering at least one surface of the component, wherein a secondary electron emission (SEE) coefficient of the multipactor inhibiting carbon nanofilm is less than a SEE coefficient of the underlying surface of the component.

The step of forming the multipactor-inhibiting carbon nanofilm may include transforming the surface of the component into the multipactor-inhibiting carbon nanofilm. The surface of the component transformed into the multipactor-inhibiting carbon nanofilm may be formed of a carbide compound, such as SiC. The surface of the component may be transformed into the multipactor-inhibiting carbon nanofilm by decomposition of the surface of the component.

The step of forming the multipactor-inhibiting carbon nanofilm may include growing the multipactor-inhibiting carbon nanofilm on the surface of the component. A first intermediate layer may be formed to cover a surface of the RF window before the multipactor-inhibiting carbon nanofilm is grown. The first intermediate layer may be a ceramic material, such as a metal nitride. The metal nitride may be aluminum nitride.

The first intermediate layer may be formed by growing the first intermediate layer on the surface of the component. The first intermediate layer may be grown by at least one of molecular beam epitaxy and pulsed laser deposition.

A second intermediate layer may be formed to cover a surface of the first intermediate layer before the multipactor-inhibiting carbon nanofilm is formed. The second intermediate layer may be a ceramic material, such as a carbide compound. The carbide compound may be silicon carbide. The second intermediate layer may be formed by growing the second intermediate layer on the first intermediate layer. The second intermediate layer may be grown by at least one of chemical vapor deposition and metalorganic vapor phase epitaxy.

The step of forming the multipactor-inhibiting carbon nanofilm may include transforming at least a portion of the second intermediate layer into the multipactor-inhibiting carbon nanofilm.

The step of growing the multipactor-inhibiting carbon nanofilm may include depositing the multipactor inhibiting carbon nanofilm by electron beam induced deposition (EBID).

The SEE coefficient of the multipactor inhibiting carbon nanofilm may be less than a SEE coefficient of conventional multipactor-inhibiting TiN coatings.

A thickness of the multipactor inhibiting carbon nanofilm may be between 0.142 nm and 14.2 nm thick.

The multipactor inhibiting carbon nanofilm may include graphene. The graphene may include a plurality of parallel $sp^2$ hybridized carbon sheets.

The component may be a waveguide comprising at least one surface defining at least one cavity through which high power RF energy is guided, wherein the multipactor-inhibiting carbon nanofilm covers the at least one surface of the waveguide.

The component may be an RF window comprising a microwave transparent material for separating a vacuum environment and a surrounding environment, wherein the multipactor-inhibiting carbon nanofilm covers at least the surface of the microwave transparent material facing the vacuum environment.

A method of using a multipactor-inhibiting carbon nanofilm coated high power RF energy device component includes exposing a multipactor-inhibiting carbon nanofilm coated surface of the component to a vacuum environment, and exposing the multipactor-inhibiting carbon nanofilm coated surface of the component to high power RF energy in the vacuum environment.

The coated component may be an RF window, and wherein the method further comprises the steps of separating the vacuum environment from a surrounding environment using the RF window, and passing high power RF energy through the RF window. The RF window may be provided to a klystron, an inductive output tube, a linear accelerator, an RF amplifier, a UHF television transmitter, a particle accelerator, a radiotherapy device, an ion accelerator, a plasma device, an RF transmitter, RF communication equipment or a high power RF device.

The coated component may be a waveguide having at least one multipactor-inhibiting carbon nanofilm coated surface defining at least one cavity, wherein the method further comprises the steps of exposing the multipactor-inhibiting carbon nanofilm coated surface of the waveguide to the vacuum environment, and passing high power RF energy through the cavity. The waveguide may be a diplexer or an output multiplexer.

The SEE coefficient of the multipactor inhibiting carbon nanofilm may be less than a SEE coefficient of conventional multipactor-inhibiting TiN coatings.

A thickness of the multipactor inhibiting carbon nanofilm may be between 0.142 nm and 14.2 nm thick.

The multipactor inhibiting carbon nanofilm may include graphene. The graphene may include a plurality of parallel $sp^2$ hybridized carbon sheets.

The carbon nanofilm may include Electron Beam Deposited Carbonaceous Layers (EBDCL).

An apparatus for high power RF transmission of the present invention includes a high power RF energy source inside a vacuum environment, and a multipactor-inhibiting carbon nanofilm coated component exposed to the vacuum environment, wherein a secondary electron emission (SEE) coefficient of the multipactor inhibiting carbon nanofilm is less than a SEE coefficient of an underlying surface of the component.

The component may be an RF window separating the vacuum environment from a surrounding environment, wherein the surface of the RF window facing the vacuum environment has the multipactor-inhibiting carbon nanofilm thereon.

The apparatus may be a klystron, an inductive output tube, a linear accelerator, an RF amplifier, a UHF television transmitter, a particle accelerator, a radiotherapy device, an ion accelerator, a plasma device, an RF transmitter, RF communication equipment or a high power RF device.

The component may be a waveguide having a cavity for guiding high power RF energy from the high power RF energy source therethrough, wherein a surface of the waveguide defining the cavity has the multipactor-inhibiting carbon nanofilm thereon. The waveguide may be a diplexer or an output multiplexer.

The SEE coefficient of the multipactor inhibiting carbon nanofilm may be less than a SEE coefficient of conventional multipactor-inhibiting TiN coatings.

A thickness of the multipactor inhibiting carbon nanofilm may be between 0.142 nm and 14.2 nm thick.

The multipactor inhibiting carbon nanofilm may include graphene. The graphene may include a plurality of parallel $sp^2$ hybridized carbon sheets.

The carbon nanofilm may include Electron Beam Deposited Carbonaceous Layers (EBDCL).

A component of the present invention that is exposed to a plasma environment includes a multipactor-inhibiting carbon nanofilm covering at least one surface of the component. The component may be a component in at least one of an RF, microwave, millimeter wave, generating device. The component may be installed in at least one of a plasma generated RF source, a plasma generated microwave source or a plasma generated millimeter source. The carbon nanofilm coating may be employed to provide enhanced reliability of the component.

AN RF window of the present invention includes a plate of material transparent to electromagnetic energy across one band, and a graphene layer on at least one surface of the plate in a thickness so as to reduce the transmission of electromagnetic energy through the RF window at another band.

A multilayer RF window of the present invention includes a material transparent to electromagnetic energy across one band, a graphene layer disposed on at least one of the surface of said material in a thickness so as to reduce the transmission of electromagnetic energy through the RF window at a second band, and a third layer that inhibits the transmission of electromagnetic energy across a third band.

DETAILED DESCRIPTION OF THE INVENTION

First Embodiment

Figure 1:
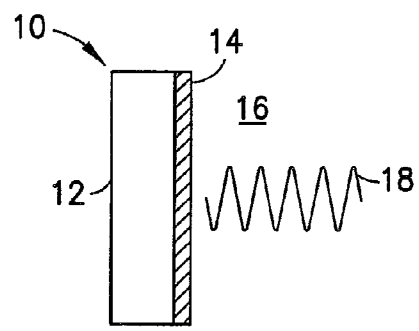
FIG. 1 illustrates a cross-sectional view of a component according to a first embodiment.

FIG. 1 illustrates a representation of a component 10 according to a first embodiment. The component 10 includes a multipactor-inhibiting carbon nanofilm 14 covering at least one surface 12 of the component 10, wherein a SEE coefficient of the multipactor inhibiting carbon nanofilm 14 is less than a SEE coefficient of the underlying surface 12 of the component 10 and, preferably, less than a SEE coefficient of conventional multipactor-inhibiting TiN coatings, which is approximately 1.5. In addition to the low SEE coefficient, the multipactor-inhibiting carbon nanofilm 14 has a low loss tangent to limit losses and overheating, and mechanical properties sufficient to handle extreme heating cycles under an applied vacuum load.

Since the SEE coefficient is a surface-sensitive property, the susceptibility of the component 10 to multipactor flashover will be controlled by the multipactor-inhibiting carbon nanofilm 14 rather than the underlying surface 12 of the component 10 if the multipactor-inhibiting carbon nanofilm is sufficiently thick and renews the surface of the component. Additionally, because the multipactor-inhibiting carbon nanofilm 14 is very thin (i.e., nanometer scale) the bulk properties of the component are retained. The thickness of the multipactor-inhibiting carbon nanofilm is preferably between 0.142 nm and 14.2 nm thick.

The multipactor-inhibiting carbon nanofilm 14 may include graphene, which exhibits excellent conductivity, emissivity, and is known to have among the lowest SEE coefficients. Graphene may also be advantageous through its chemical properties. In particular, graphene has been observed to act as a chemical barrier between an underlying material and the ambient environment. Adsorption to graphene surfaces is very limited and the dominant physisorption mechanic allows for almost complete desorption with low levels of heating, much lower than the likely operating conditions. As such, graphene coatings allow for a relative immunity to exposure and contamination degradation.

Figure 2:
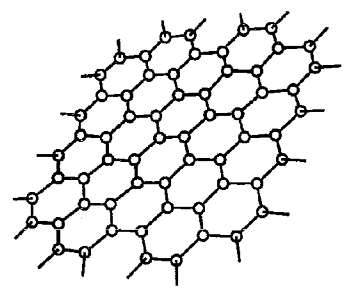
FIG. 2 illustrates one monolayer of graphene.

Graphene refers to between one or several $sp^2$ hybridized carbon sheets. FIG. 2 illustrates a representation of one monolayer (i.e., one $sp^2$ hybridized carbon sheet) of graphene. Preferably, the graphene includes a plurality of $sp^2$ hybridized carbon sheets that are parallel to the underlying surface 12 of the component 10. In this case, positioning the carbon sheets to be parallel to the surface of the underlying surface 12 enables the multipactor-inhibiting carbon nanofilm 14 to include larger $sp^2$ hybridized carbon sheets while maintaining a uniform thickness of the multipactor-inhibiting carbon nanofilm 14. The parallel positioning of the carbon sheets may be adhered by epitaxially forming the graphene on the surface of the component under appropriate conditions.

Returning to FIG. 1, the multipactor-inhibiting carbon nanofilm 14 may form a cover (or blanket) on the surface 12 of the component 10. Some related art methods of manufacturing graphene may be insufficient to cover a surface. For example, one conventional method of manufacturing graphene used micromechanical exfoliation to form isolated flakes of graphene that were subsequently transferred to the surface of a substrate, and thereby the graphene did not cover the surface of the substrate.

In a preferred embodiment, the multipactor-inhibiting carbon nanofilm 14 covers the entire surface 12 of the component 10 that is exposed to a vacuum environment 16. However, in some circumstances it may only be necessary to cover a portion of the entire surface 12 if, for example, only a portion of the entire surface 12 is exposed to high power RF energy 18.

The multipactor-inhibiting carbon nanofilm 14 may include Electron Beam Deposited Carbonaceous Layers (EBDCL), which has been observed as a mixture of graphitic and other carbonaceous layers such as Diamond-Like-Carbon (DLC) but is not limited thereto. EBDCLs are formed by Electron Beam Induced Deposition (EBID). It is believed that EBID decomposes gaseous molecules leading to deposition of fragments of the gaseous molecules onto the surface 12 of the component 10, resulting in an EBDCL nanofilm 14 having excellent multipactor-inhibiting characteristics.

The multipactor-inhibiting carbon nanofilm 14 may be formed on, for example, a metal surface (such as a copper surface, a silver surface, a gold surface, or preferably oxygen-free copper with silver or gold plating) or a ceramic material. The ceramic material may include a metal oxide material (such as single crystalline sapphire or polycrystalline alumina), a metal nitride material (such as aluminum nitride), a carbide compound (such as silicon carbide), or combinations thereof.

As will be described in further detail with respect to more specific embodiments below, the component 10 may be a waveguide, an RF window, or any other component that is exposed to high power RF energy 18 in a vacuum environment 16, and particularly any such component of a high power RF energy device that is susceptible to failure due to multipactor flashover.

Second Embodiment

The RF/microwave community has long identified RF windows as a major fault point, with frequent failure events due to multipactor flashover, putting a low upper limit on practical operating ranges. To address this need, the second embodiment is directed to improved RF windows having multipactor-inhibiting carbon nanofilms thereon.

Figure 3:
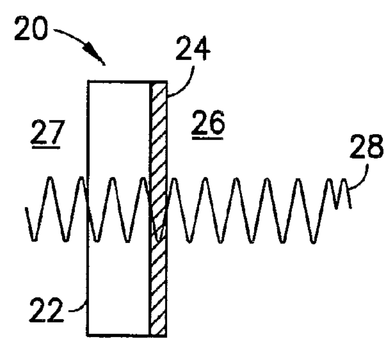
FIGS. 3 and 4 illustrate cross-sectional views of an RF window according to a second embodiment.

FIG. 3 illustrates a representation of an RF window 20 according to the second embodiment. An RF window is a conventional component of a high power RF (Radio Frequency) energy device, such as plasma sources, high power microwave devices and particle accelerating devices that require isolated vacuum environments in order to operate.

Radio Frequency electron beam accelerators, klystrons, and magnetrons are all believed to require RF windows. As represented in FIG. 3, the RF window 20 includes a microwave transparent material 22 and a multipactor-inhibiting carbon nanofilm 24 covering at least one surface of the microwave transparent material 22.

A first function of the RF window 20 is to permit extraction of energy generated from high power RF energy devices by allowing transmission of microwave power 28 from a vacuum environment 26 of a high power RF energy device, through the RF window 20 and to a surrounding air filled or inert gas filled environment 27. To achieve this function, the RF window 20 is formed of a microwave transparent material 22. The microwave transparent material 22 may be a ceramic material having high microwave transparency. The ceramic material may include metal nitrides having high microwave transparency, such as aluminum nitride, metal oxides having high microwave transparency, such as alumina (often referred to as sapphire if in single crystal form), beryllium oxide, and quartz. However, other materials, such as aluminum oxynitride, recognized as having a microwave transparency sufficient to efficiently permit extraction of energy generated from the high power RF energy devices may be suitable. Two particularly preferred microwave transparent materials 22 are single crystalline sapphire and polycrystalline alumina. Sapphire has a higher microwave transparency than polycrystalline alumina, but polycrystalline alumina has better mechanical properties.

Figure 5:
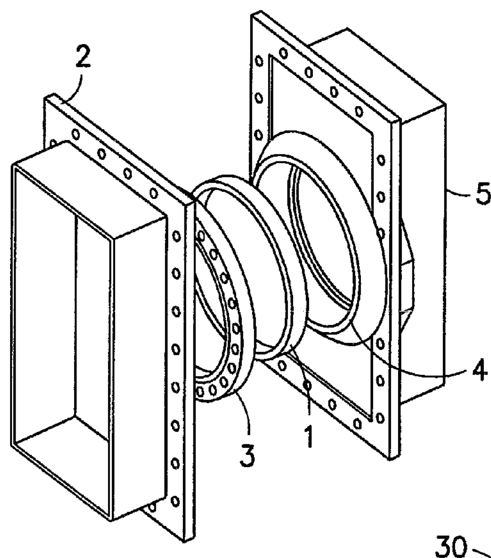
FIG. 5 illustrates an exploded perspective view of a conventional RF window assembly.

A second function of RF windows 20 is to serve as a physical barrier between the vacuum environment 26 and the surrounding environment 27, to prevent surrounding atmosphere, dust, and debris from entering the vacuum cavity of the high power RF energy device. To achieve this function, the microwave transparent material 22 is formed of sufficient thickness and is shaped, sized, and otherwise configured to handle the stress resulting from the vacuum environment 26 at one surface and the surrounding environment 27 at the other surface. The ranges of acceptable thicknesses, shapes, sizes, and other configurations of RF windows 20 are known by those skilled in the art, and it is believed that any such configurations would be suitable for use as the microwave transparent material 22. For example, FIG. 5 illustrates a conventional RF window 1 that would be suitable for use as the microwave transparent material 22. As illustrated, the conventional RF window 1 is assembled with air side waveguide 2, clamping flange 3, gasket 4, and vacuum side waveguide 5.

As previously indicated, the RF window 20 includes a multipactor-inhibiting carbon nanofilm 24 covering at least the surface of the microwave transparent material 22 facing the vacuum environment 26. The multipactor-inhibiting carbon nanofilm 24 may include any carbon nanofilm 24 having a lower SEE coefficient than the microwave transparent material 22. Like the first embodiment, the SEE coefficient of the multipactor inhibiting carbon nanofilm 24 is preferably less than a SEE coefficient of conventional multipactor-inhibiting TiN coatings, which is approximately 1.5. Additionally, because the multipactor-inhibiting carbon nanofilm 24 is very thin (i.e., nanometer scale) the bulk properties of the microwave transparent material 22 are retained. The thickness of the multipactor-inhibiting carbon nanofilm 24 is preferably between 0.142 nm and 14.2 nm thick.

As previously explained with reference to the first embodiment, the multipactor-inhibiting carbon nanofilm 24 may include graphene, for example epitaxial graphene. Preferably, the graphene includes a plurality of $sp^2$ hybridized carbon sheets that are parallel to the surface of the microwave transparent material 22. Also, the multipactor-inhibiting carbon nanofilm 24 may form a cover (or blanket) on the surface of the microwave transparent material 22. In a preferred embodiment, the multipactor-inhibiting carbon nanofilm 24 covers the entire surface of the microwave transparent material 22 that is exposed to the vacuum environment 26. However, it may only be necessary to cover a portion of that surface if, for example, only a portion of that surface is exposed to high power RF energy 28.

The multipactor-inhibiting carbon nanofilm 24 may include Electron Beam Deposited Carbonaceous Layers (EBDCL), which has been observed as a mixture of graphitic and other carbonaceous layers such as Diamond-Like-Carbon (DLC) but is not limited thereto. EBDCLs are preferentially formed by Electron Beam Induced Deposition (EBID).

Figure 4:
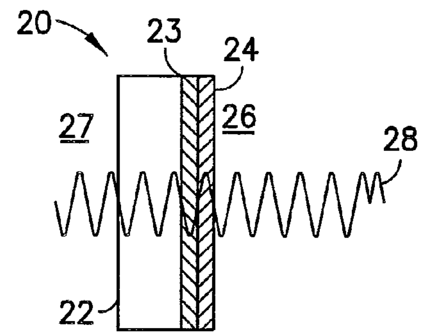

As illustrated in FIG. 4, the RF window 20 may further include one or more intermediate layers 23 between the microwave transparent material 22 and the multipactor inhibiting carbon nanofilm 24. The intermediate layers 23 may include ceramic materials. In exemplary embodiments, the intermediate layers include a metal nitride (such as MN) and/or a carbide compound (such as SiC). The one or more intermediate layers 23 may be helpful in facilitating the formation of a multipactor-inhibiting carbon nanofilm 24 by allowing for lattice matching and growth of the graphene layers on the one or more intermediate layers 23. A range of heterostructures formed with different combinations of intermediate layer thicknesses may be suitable, with possible relationships between heterostructure design parameters and properties.

In terms of thermal and mechanical properties, graphene (and carbon-based materials in general), SiC, and AlN (utilized intermediate layers) each have much higher thermal conductivities than $Al_2O_3$ or even sapphire, which is significant at the surface of a component, such as an RF window 20, in applications where accelerated vacuum electrons constitute a significant source of surface-localized heating.

Third Embodiment

The RF/microwave community has also long strived to increase the power handling capability of waveguides in a vacuum. Waveguides for a high power RF energy device are typically used to channel energy and to filter frequencies. Many RF electron beam accelerators, klystrons, and magnetrons require such a waveguide. In order to guide energy generated from high power RF energy devices, waveguides include cavities that are put under a vacuum and exposed to high microwave energy. To address this need, the third embodiment is directed to improved waveguides having multipactor-inhibiting carbon nanofilms thereon.

Figure 6:
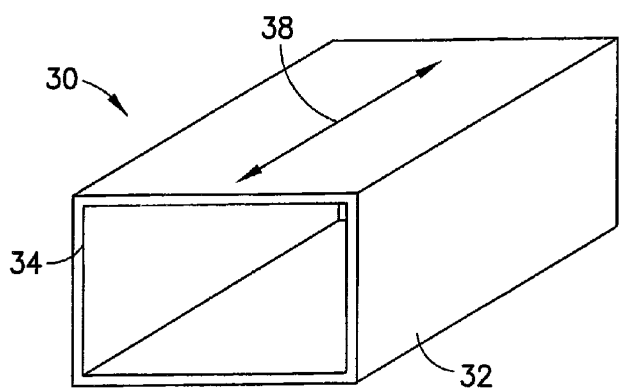
FIG. 6 illustrates a perspective view of a waveguide according a third embodiment.
Figure 7:
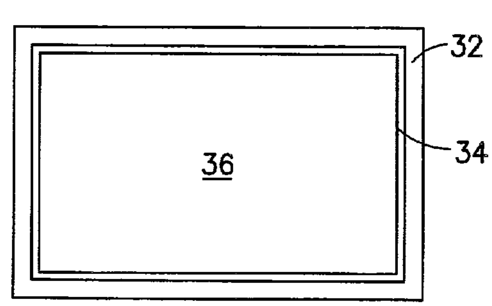
FIG. 7 illustrates a cross-sectional view of the waveguide of FIG. 6.

As referenced herein, the term waveguide is used to include one or more structures that include one or more surfaces defining at least one cavity through which high power RF energy is guided. As shown in FIGS. 6 and 7, an illustrated waveguide 30 includes a plurality of surfaces 32 defining a cavity 36 through which high power RF energy is guided along a waveguide axis direction 38 while surfaces 32 are exposed to the high power RF energy.

Although the waveguide 30 is represented in FIGS. 6 and 7 as a simple configuration, the complex configurations of waveguides are known by those skilled in the art, and it is believed that any such waveguide configurations would be suitable for use in the third embodiment. For example, the waveguide 30 may be diplexer, which is a device that implements frequency domain multiplexing using two ports that are multiplexed into a common port using a common cavity and cavities leading to the two other ports. One or more of the cavities (preferably all) may include multipactor-inhibiting carbon nanofilms 34 thereon. Satellite transponders act as repeaters for communication networks, but where it is common for terrestrial repeaters to transmit at the received frequency, satellite transponders convert the received signal to a different (usually higher) band before transmitting the signal back (the 'downlink'). In this process, diplexers allow the transmit and receive functions to share an antenna. In addition to diplexer, the multipactor-inhibiting carbon nanofilms 34 may be formed on other types of waveguides 30, such as output multiplexers that transmit high power levels.

As shown in FIGS. 6 and 7, the waveguide 30 includes a multipactor-inhibiting carbon nanofilm 34 covering at least one of the surfaces 32 of the waveguide 30, and preferably all of the surfaces 32 defining the cavity 36 in the waveguide 30 (as illustrated in FIGS. 6 and 7). As with the first and second embodiments, the multipactor-inhibiting carbon nanofilm 34 may include any carbon nanofilm 34 having a lower SEE coefficient than the surfaces 32 of the waveguide 30, and the SEE coefficient of the multipactor inhibiting carbon nanofilm 34 is preferably less than a SEE coefficient of conventional multipactor-inhibiting TiN coatings. The thickness of the multipactor-inhibiting carbon nanofilm 34 is preferably between 0.142 nm and 14.2 nm thick.

The multipactor-inhibiting carbon nanofilm 34 may include graphene, for example epitaxial graphene. Preferably, the graphene includes a plurality of $sp^2$ hybridized carbon sheets that are parallel to the surface 32 of the waveguide 30. Also, the multipactor-inhibiting carbon nanofilm 34 may form a cover (or blanket) on the surface 32 of the waveguide 30. In a preferred embodiment (as illustrated in FIGS. 6 and 7), the multipactor-inhibiting carbon nanofilm 34 covers the entirety of one of the surfaces 32 of the waveguide 30. However, it may only be necessary to cover a portion of that surface 32 if, for example, only a portion of that surface 32 is exposed to high power RF energy.

The multipactor-inhibiting carbon nanofilm 34 may include Electron Beam Deposited Carbonaceous Layers (EBDCL), which has been observed as a mixture of graphitic and other carbonaceous layers such as Diamond-Like-Carbon (DLC) but is not limited thereto. EBDCLs are preferentially formed by Electron Beam Induced Deposition (EBID). It is believed that EBID decomposes gaseous molecules leading to deposition of fragments of the gaseous molecules onto the surface of the waveguide 30, resulting in a carbon nanofilm 34 having excellent multipactor-inhibiting characteristics.

The waveguide 30 may be formed of, for example, a metal surface. The metal may include, for example, copper, silver or gold, or oxygen-free copper with silver or gold plating. As such, the waveguide 30 utilizes the carbon nanofilm 34 to inhibit multipactor, while maintaining the low-loss metals as a bulk base.

Methods of Manufacture

Conventionally, there were three major known techniques for producing graphene, one allows only for deposition on metals, the second (micromechanical exfoliation with Scotch Tape) produces only small 'flakes' that can then be transferred to a substrate, and the third method requires a crystalline (or at least oriented) (0001) SiC surface. SiC is a challenging material to grow as a film in its own right, but its difficulties are relatively well understood, and SiC/AlN/sapphire structures have previously been successfully grown.

The inventors have found that the multipactor-inhibiting carbon nanofilms of the first to third embodiments can be formed by at least the following methods. In one exemplary method, the multipactor-inhibiting carbon nanofilm may be formed by transforming the surface of the component into the multipactor-inhibiting carbon nanofilm, such as by decomposing the surface of the component into the multipactor-inhibiting carbon nanofilm. In one specific example, a multipactor-inhibiting graphene nanofilm is formed by graphitization of SiC.

Alternatively, the multipactor-inhibiting carbon nanofilm may be grown on the surface of the component. For example, in order to grow an epitaxial graphene layer on an alumina material, such as polycrystalline sapphire, a first intermediate layer (AlN) was epitaxially formed by, for example, molecular beam epitaxy or pulsed laser deposition, to cover a surface of the alumina material, and a second intermediate layer (SiC) was epitaxially formed by, for example, chemical vapor deposition or metalorganic vapor phase epitaxy, to cover a surface of the first intermediate layer. Then, the second intermediate layer was transformed into the multipactor-inhibiting carbon nanofilm by decomposing the second intermediate layer via a graphitization annealing procedure.

In a more specific example of manufacturing an RF window described below, an epitaxial graphene nanofilm is formed on the surface of the RF window by graphitization of SiC, while still maintaining sapphire as the bulk dielectric to take advantage of its exceptional bulk dielectric properties.

While SiC has a good structural match with sapphire (both having hexagonal systems), the lattice match is poor. To overcome the challenge of covering the surface of the alumina with graphene, intermediate layers of both AlN and SiC are utilized allowing for lattice matching and growth of the graphene layers, which occurs by graphitization of the SiC layer. As a result, film qualities are greatly improved. The AlN buffer layer may be epitaxially grown on sapphire by a number of different techniques, including molecular beam epitaxy and pulsed laser deposition. SiC may be grown by, for example, high-temperature chemical vapor deposition processes using precursors such as silane ($SiH_4$) and propane ($C_3H_8$). Additionally, growth of SiC on AlN may use, for example, metalorganic vapor phase epitaxy.

For metallic components, a number of different processes for growing graphene on metal surfaces are known. For example, growth of graphene on metal surfaces can be achieved by anneal in a methane/$H_2$ mix environment.

In another method, a multipactor-inhibiting carbon nanofilm may be grown on metal or ceramic surfaces of a component by depositing the carbon nanofilm using electron beam induced deposition (EBID) to form electron beam deposited carbonaceous layers (EBDCL).

Methods of Use

The components according to the first to third embodiments may be used by exposing a multipactor-inhibiting carbon nanofilm coated surface of the component to a vacuum environment, and exposing the multipactor-inhibiting carbon nanofilm coated surface of the component to high power RF energy in the vacuum environment. The term RF energy includes energy transmitted in radio frequency wavelengths, microwave wavelengths, or millimeter wavelengths.

For RF windows, the RF window can be positioned to separate the vacuum environment from a surrounding environment, and high power RF energy (such as energy corresponding to radio frequency, microwave, or millimeter wavelengths) may be passed through the RF window. Such an RF window may be provided to a klystron, an inductive output tube, a linear accelerator, an RF amplifier, a UHF television transmitter, a particle accelerator, a radiotherapy device, an ion accelerator, a plasma device, an RF transmitter, RF communication equipment, or a high power RF or microwave device.

For waveguides, the multipactor-inhibiting carbon nanofilm coated surface of the waveguide may be exposed to the vacuum environment, and high power RF energy may be passed through the cavity of the waveguide. In this case, the waveguide may be, for example, a diplex or a transponder.

Figure 8:
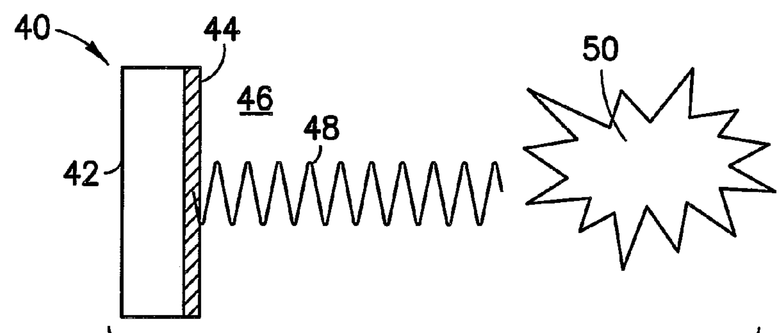
FIG. 8 illustrates an apparatus including a coated component according to another embodiment.

The components according to the first to third embodiments may also be included in an apparatus for high power RF transmission. As illustrated in FIG. 8, such a representative apparatus includes a high power RF energy source 50 inside a vacuum environment 46 and a multipactor-inhibiting carbon nanofilm coated component 40 exposed to the vacuum environment 46, wherein a secondary electron emission (SEE) coefficient of the multipactor inhibiting carbon nanofilm 44 is less than a SEE coefficient of an underlying surface 42 of the component 40. In one specific example, the high power RF energy source 50 is a plasma energy source and the vacuum environment 46 is a plasma environment.

If the multipactor-inhibiting carbon nanofilm coated component 40 is an RF window, then the RF window additionally functions to separate the vacuum environment 46 from a surrounding environment as explained above with reference to the second embodiment of the component, wherein the surface of the RF window facing the vacuum environment 46 has the multipactor-inhibiting carbon nanofilm 44 thereon. If the multipactor-inhibiting carbon nanofilm coated component 40 is a waveguide, then the waveguide has a cavity 46 for guiding high power RF energy 48 from the high power RF energy source 50 therethrough, wherein a surface 42 of the waveguide defining the cavity 46 has the multipactor-inhibiting carbon nanofilm 44 thereon.

In any case, the apparatus including the coated components of the first to third embodiments may be, for example, a klystron, an inductive output tube, a linear accelerator, an RF amplifier, a UHF television transmitter, a particle accelerator, a radiotherapy device, an ion accelerator, a plasma device, an RF transmitter, RF communication equipment, or a high power RF or microwave device.

Furthermore, since graphite, graphene and diamond-like nano-coatings provide mechanisms for transmission of electromagnetic energy efficiently at some frequencies while blocking electromagnetic frequencies at other frequencies, the inventions can be used to reduce multipactor effects as well as serving as a mechanism to block certain bands of electromagnetic energy. For example, a component, such as an RF window, can include a material (such as a plate of material) that is transparent to electromagnetic energy across one band, and a carbon nanolayer (such as graphene) on at least one surface of the material in a thickness so as to reduce the transmission of electromagnetic energy through the component at another band. Alternatively, a component, such as a multilayer RF window, can include a material that is transparent to electromagnetic energy across one band, a carbon nanolayer (such as graphene) on at least one surface of the material in a thickness so as to reduce the transmission of electromagnetic energy through the component at another band, and a third layer that inhibits transmission of electromagnetic energy across a third band.

Additional Benefits

The particle accelerator industry includes a wide range of medical, research, and security applications. While RF windows are only a small portion of this multibillion dollar industry, high-quality and affordable RF windows would be of interest for a broader range of applications involving RF transmission, particularly military.

A significant portion of global research in physics is based on data produced at the few major particle accelerator laboratories located around the world. Such facilities, and those planned but not yet assembled, would find value in the described multipactor-inhibiting carbon nanofilms in the form of higher accelerator energies, a decrease in the number of klystrons required for energy input, or lower bottom line project costs, each of which results in the availability of more and better data for analysis by the many interested research institutions. The current plans for the International Linear Collider (ILC) project, for example, include an expectation that over 15,000 accelerating cavities will be necessary for operation, with the planned ILC phase II perhaps doubling the total. If an improved RF window allowing more power transmission per unit was available, it would allow the project to cut back on the number of accelerator cavities required.

Also, for many applications accelerator technology is currently prohibitive and this is in part due to the ratio of cost to transmittable power. It is reasonable to expect that a significant change in that ratio would result in at least a comparable improvement in market receptivity to accelerator-based solutions to society's demands. Medically, accelerator technology has already been accepted for use in treatment of certain forms of cancer, such as prostate, neck, and head, and in rarer cases breast, thyroid, lung, gastrointestinal, and gynecologic malignancies.

Also, in recent years, the use of satellites for communication hubs has greatly increased, both for commercial and military applications. In satellite applications, distances are great and size-weight-and-power factors are magnified, and the demand for high power handling out of a low-weight device is extreme. However, due to the vacuum environment, the potential for a catastrophic multipactor event poses severe restrictions on size and component design. The above-described multipactor-inhibiting carbon nanofilms possess exceptional properties for space applications in terms of secondary electron emission coefficient, emissivity, conductivity, and chemical stability. These multipactor-inhibiting carbon nanofilms can be used for improved $K_u$-band diplexer devices having superior performance, in terms of size and power handling, to those in current use. By improving the SEE coefficient, multipactor performance systems can be designed that are capable of withstanding high power RF transmission environments in the vacuum of space. The major effect of direct incorporation of the previously described multipactor inhibiting coatings is an increase in power handling capability. The reduced secondary electron emission coefficients enable an increase in power while retaining a low probability of multipaction.

Further aspects and features of the present invention are described below and with reference to studies that support the description of the above embodiments and below further aspects and features.

This technology is supported by studies of the growth and processing of graphene films, nitrides, and oxide dielectrics. For graphene, epitaxial growth by annealing of SiC substrates in a vacuum (or in certain controlled atmospheres) was studied on both the C- and Si-faces. It was observed that on the C-face, growth rapidly leads to thick graphene (>2 nm) even at relatively low temperatures (~1200° C.), where on the Si-face growth is slower and tends to plateau at thicknesses of a few monolayers (<1 nm). While for vacuum annealed Si-face epitaxial graphene there was significant 3D-growth behavior resulting in a distribution of thicknesses over the surface of the sample, the addition of 1 atm of Argon as a process gas resulted in a much more controlled 2D-growth mode allowing for greatly reduced thickness variations. Post-growth thickness measurement-based growth rate calibrations did not allow for the level of thickness precision necessary to achieve that goal, and so methods to monitor graphene production using in-situ characterization techniques such as low-energy electron diffraction were examined. Consistent, reproducible films with highly controlled thicknesses and monolayer coverages can be produced using these techniques.

To produce high-quality, flat (2D growth mode) films for AlGaN, TiN, $TiO_2$, perovskite oxides, and graphene, lower temperatures and faster growth rates tend to result in smoother film surfaces, but there is a significant trade-off in terms of crystallinity with both of these factors increasing defect concentrations, reducing epitaxy, and in extreme cases precluding the formation of the intended phase. Nitrides were the most sensitive to deposition conditions. Nitrogen ($N_2$) is far less reactive than oxygen, and to prevent growth from resulting in an oxide or oxy-nitride, either the oxygen background was minimized or a more active nitrogen source than $N_2$ was used. Two options for such a nitrogen source are ammonia and atomic nitrogen, which can be obtained through the use of an RF source.

Other work focused on producing new dielectric materials for high frequency applications. As a part of this effort, a variety of different dielectric characterization methods were used. Interdigitated capacitor structures were produced by photolithography, allowing for measurement of the dielectric constant and loss tangent over a wide range (250 MHz to 10 GHz). To improve on the accuracy of measurements, split cavity dielectric measurements were used, measuring samples before and after film growth to back out film dielectric properties with extreme precision. Parallel plate capacitor structures were also grown and tested.

To produce graphene, substrates may be heated to graphitization temperatures, producing a graphene nanofilm of interest. Secondary electron emission coefficient is dominated by the surface composition, with thickness of the graphene nanofilm ranging from around 2 nm to around 15 nm.

AlN films with varying thicknesses may be grown on commercial sapphire (0001) substrates by pulsed laser deposition. Initially, films may be grown to calibrate pulse rate, temperature, and pressure conditions where 2D growth of AlN (as measured by atomic force microscopy). Growth rate may then be calibrated by X-ray reflectivity thickness measurement using samples produced under these conditions.

Graphene coatings may be characterized for structure, dielectric properties, secondary electron emission coefficients, and mechanical properties. The main purpose of the structural characterization is to confirm successful graphitization and to measure the thickness of the graphene film. For these purposes, Low Energy Electron Diffraction (LEED) and Auger spectroscopy may be utilized.

Figure 9:
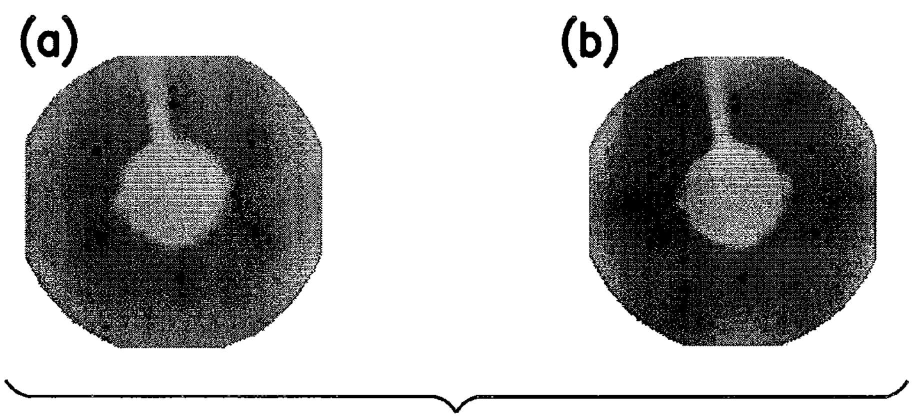
FIGS. 9(*a*) and 9(*b*) are Low Energy Electron Diffraction (LEED) results, where in 9(*a*) a sample has been resistively heated in a vacuum to approximately 1290° C. for 5 minutes, and in 9(*b*) the sample was then annealed in a vacuum for 5 minutes at about 1360° C.

After graphitization, films may be characterized using LEED, which confirms that the structure of the surface is indeed that of graphene. See FIGS. 9(*a*) and 9(*b*), wherein 9(*a*) a sample has been resistively heated in a vacuum to approximately 1290° C. for 5 minutes. At 60 eV, the penetration depth of the incident electrons is low enough that only the top 1-2 monolayers of the sample are contributing to the image, and the image is that of a reconstructed SiC surface, the expected precursor to graphene formation. The sample was then annealed in a vacuum for 5 minutes at about 1360° C., and after cooling, the image in 9(*b*) was obtained, again at 60 eV. Note in 9(*b*), the presence of 12 major points, which can be viewed as the corners of two different hexagons, with different sizes and rotated by 30° relative to one another. The outer hexagon is the diffraction image of the graphene; the smaller one is due to the reconstructed SiC. After heating to the higher temperature as in 9(*b*), the smaller hexagon (intensity from the SiC) dims as the graphene proceeds toward full coverage of the substrate.

Thus, LEED confirms the presence of crystalline graphene. To get a specific thickness of the graphene, Auger spectroscopy is employed. By looking at the ratios of the Si and C peaks in the Auger spectrum, the amount of excess carbon on the surface is determined and in combination with the LEED it is known that the excess carbon is graphene.

Secondary electron emission coefficients may be measured using an Auger spectroscopy system equipped with a sample holder having a Faraday cup capable of an independent bias to prevent electron pullback. Samples may be metalized into capacitor structures as a simple route toward dielectric property characterization.

The quality of a graphene nanocoating may be affected by the quality of the SiC that is graphitized, and the quality of that SiC may be affected by the crystallinity of the AlN it is grown on. The morphology of the AlN may be measured by atomic force microscopy focusing on the rms roughness of the surface. MN films may be grown with roughness equaling the geometrically necessary roughness due to miscut steps. Crystalline quality may be quantified using film rocking curves measured by X-ray diffraction, and growth conditioning results in the minimum possible full widths at half maximum of the rocking curves.

Dielectric measurements may be used to analyze the dielectric properties of the samples. In this case, accurate measurement of the dielectric constant and loss of the composite may have a close relationship with the expected dielectric properties of any final window, and therefore be of significant relevance to the overall properties of any window designed along these lines.

While the device and method of the present invention have been described with respect to preferred embodiments, various modifications and alterations may be made without departing from the spirit and scope of the present invention. The scope of the present invention is defined in the appended claims and equivalents thereto.

The invention claimed is:

1. A method of manufacturing a high power RF, microwave, or millimeter wave energy device component that is exposed to high power RF energy in a vacuum environment, comprising the steps of:

forming a multipactor-inhibiting carbon nanofilm covering at least one surface of the component, wherein a secondary electron emission (SEE) coefficient of the multipactor inhibiting carbon nanofilm is less than a SEE coefficient of the underlying surface of the component.

2. The method of claim 1, wherein the step of forming the multipactor-inhibiting carbon nanofilm includes growing the multipactor-inhibiting carbon nanofilm on the surface of the component.

3. The method of claim 2, wherein a first intermediate layer is formed to cover a surface of the RF window before the multipactor-inhibiting carbon nanofilm is grown.

4. The method of claim 3, wherein the first intermediate layer is a ceramic material.

5. The method of claim 4, wherein the ceramic material is a metal nitride.

6. The method of claim 5, wherein the metal nitride is aluminum nitride.

7. The method of claim 6, wherein the first intermediate layer is formed by growing the first intermediate layer on the surface of the component.

8. The method of claim 7, wherein the first intermediate layer is grown by at least one of molecular beam epitaxy and pulsed laser deposition.

9. The method claim 3, wherein a second intermediate layer is formed to cover a surface of the first intermediate layer before the multipactor-inhibiting carbon nanofilm is formed.

10. The method of claim 9, wherein the second intermediate layer is a ceramic material.

11. The method of claim 10, wherein the ceramic material is a carbide compound.

12. The method of claim 11, wherein the carbide compound is silicon carbide.

13. The method of claim 9, wherein the second intermediate layer is formed by growing the second intermediate layer on the first intermediate layer.

14. The method of claim 13, wherein the second intermediate layer is grown by at least one of chemical vapor deposition and metalorganic vapor phase epitaxy.

15. The method of claim 9, wherein the step of forming the multipactor-inhibiting carbon nanofilm includes transforming at least a portion of the second intermediate layer into the multipactor-inhibiting carbon nanofilm.

16. The method of claim 2, wherein the step of growing the multipactor-inhibiting carbon nanofilm includes depositing the multipactor inhibiting carbon nanofilm by electron beam induced deposition (EBID).

17. The method of claim 1, wherein the step of forming the multipactor-inhibiting carbon nanofilm includes transforming the surface of the component into the multipactor-inhibiting carbon nanofilm.

18. The method of claim 17, where the surface of the component transformed into the multipactor-inhibiting carbon nanofilm is formed of a carbide compound.

19. The method of claim 18, wherein the carbide compound is SiC.

20. The method claim 17, wherein the surface of the component is transformed into the multipactor-inhibiting carbon nanofilm by decomposition of the surface of the component.

21. The method of claim 1, wherein the multipactor inhibiting carbon nanofilm includes graphene.

22. The method of claim 21, wherein the graphene includes a plurality of parallel $sp^2$ hybridized carbon sheets.

23. The method of claim 1, wherein the SEE coefficient of the multipactor inhibiting carbon nanofilm is less than a SEE coefficient of conventional multipactor-inhibiting TiN coatings.

24. The method of claim 1, wherein a thickness of the multipactor inhibiting carbon nanofilm is between 0.142 nm and 14.2 nm thick.

25. The method of claim 1, wherein the component is a waveguide comprising at least one surface defining at least one cavity through which high power RF energy is guided, wherein the multipactor-inhibiting carbon nanofilm covers the at least one surface of the waveguide.

26. The method of claim 1, wherein the component is an RF window comprising a microwave transparent material for separating a vacuum environment and a surrounding environment, wherein the multipactor-inhibiting carbon nanofilm covers at least the surface of the microwave transparent material facing the vacuum environment.

27. A high power RF, microwave, or millimeter wave energy device component that is exposed to high power RF energy in a vacuum environment, wherein the component includes:

a multipactor-inhibiting carbon nanofilm covering at least one surface of the component, wherein a secondary electron emission (SEE) coefficient of the multipactor inhibiting carbon nanofilm is less than a SEE coefficient of the underlying surface of the component.

28. The component of claim 27, wherein the surface of the component is formed of a ceramic material.

29. The component of claim 28, wherein the ceramic material includes a metal oxide material.

30. The component of claim 29, wherein the metal oxide material is alumina.

31. The component of claim 30, wherein the alumina is single crystalline sapphire.

32. The component of claim 30, wherein the alumina is polycrystalline alumina.

33. The component of claim 28, wherein the ceramic material includes a metal nitride material.

34. The component of claim 33, wherein the metal nitride material is aluminum nitride.

35. The component of claim 28, wherein the ceramic material includes a carbide compound.

36. The component of claim 35, wherein the carbide compound is silicon carbide.

37. The component of claim 27, wherein the surface of the component is a metal surface.

38. The component of claim 37, wherein the metal is formed of copper, silver or gold.

39. The component of claim 38, wherein the metal is formed of copper plated with silver or gold.

40. The component of claim 27, wherein the multipactor inhibiting carbon nanofilm includes graphene.

41. The component of claim 40, wherein the graphene includes a plurality of parallel $sp^2$ hybridized carbon sheets.

42. The component of claim 27, wherein the SEE coefficient of the multipactor inhibiting carbon nanofilm is less than a SEE coefficient of conventional multipactor-inhibiting TiN coatings.

43. The component of claim 27, wherein a thickness of the multipactor inhibiting carbon nanofilm is between 0.142 nm and 14.2 nm thick.

44. The component of claim 27, wherein the carbon nanofilm includes Electron Beam Deposited Carbonaceous Layers (EBDCL).

45. The component of claim 27, wherein the component is a waveguide comprising at least one surface defining at least one cavity through which high power RF energy is guided, wherein the multipactor-inhibiting carbon nanofilm covers the at least one surface of the waveguide.

46. The component of claim 27, wherein the component is an RF window comprising a microwave transparent material for separating a vacuum environment and a surrounding environment, wherein the multipactor-inhibiting carbon nanofilm covers at least the surface of the microwave transparent material facing the vacuum environment.

47. An RF window for high power RF, microwave, or millimeter wave energy devices, comprising:

a microwave transparent material for separating a vacuum environment and a surrounding environment; and a multipactor-inhibiting carbon nanofilm covering at least the surface of the microwave transparent material that faces the vacuum environment, wherein a secondary electron emission (SEE) coefficient of the multipactor inhibiting carbon nanofilm is less than a SEE coefficient of the microwave transparent material.

48. The RF window of claim 47, further comprising an intermediate layer between the microwave transparent material and the multipactor inhibiting carbon nanofilm.

49. The RF window of claim 48, wherein the intermediate layer includes a ceramic material.

50. The RF window of claim 49, wherein the ceramic material includes a metal nitride.

51. The RF window of claim 50, wherein the metal nitride is AlN.

52. The RF window of claim 49, wherein the carbide compound is SiC.

53. The RF window of claim 52, wherein the ceramic material includes a carbide compound.

54. The RF window of claim 47, wherein the microwave transparent material is formed of a ceramic material.

55. The RF window of claim 54, wherein the ceramic material includes a metal oxide material.

56. The RF window of claim 55, wherein the metal oxide material is alumina.

57. The RF window of claim 56, wherein the alumina is single crystalline sapphire.

58. The RF window of claim 56, wherein the alumina is polycrystalline alumina.

59. The RF window of claim 47, wherein the multipactor inhibiting carbon nanofilm includes graphene.

60. The RF window of claim 59, wherein the graphene includes a plurality of parallel $sp^2$ hybridized carbon sheets.

61. The RF window of claim 47, wherein the SEE coefficient of the multipactor inhibiting carbon nanofilm is less than a SEE coefficient of conventional multipactor-inhibiting TiN coatings.

62. The RF window of claim 47, wherein a thickness of the multipactor inhibiting carbon nanofilm is between 0.142 nm and 14.2 nm thick.

63. The RF window of claim 47, wherein the carbon nanofilm includes Electron Beam Deposited Carbonaceous Layers (EBDCL).

64. A waveguide for a high power RF, microwave, or millimeter wave energy device, comprising:

at least one surface defining at least one cavity through which high power RF energy is guided; and a multipactor-inhibiting carbon nanofilm covering the at least one surface of the waveguide, wherein a secondary electron emission (SEE) coefficient of the multipactor inhibiting carbon nanofilm is less than a SEE coefficient of the at least one surface of the waveguide.

65. The waveguide of claim 64, wherein the surface of the waveguide is a metal surface.

66. The waveguide of claim 65, wherein the metal is fowled of copper, silver or gold.

67. The waveguide of claim 66, wherein the metal is formed of copper plated with silver or gold.

68. The waveguide of claim 64, wherein the multipactor inhibiting carbon nanofilm includes graphene.

69. The waveguide of claim 68, wherein the graphene includes a plurality of parallel $sp^2$ hybridized carbon sheets.

70. The waveguide of claim 64, wherein the SEE coefficient of the multipactor inhibiting carbon nanofilm is less than a SEE coefficient of conventional multipactor-inhibiting TiN coatings.

71. The waveguide of claim 64, wherein a thickness of the multipactor inhibiting carbon nanofilm is between 0.142 nm and 14.2 nm thick.

72. The waveguide of claim 64, wherein the carbon nanofilm includes Electron Beam Deposited Carbonaceous Layers (EBDCL).

73. The waveguide of claim 64, wherein the waveguide is a diplexer.

74. The waveguide of claim 64, wherein the waveguide is an output multiplexer.

75. A method of using a multipactor-inhibiting carbon nanofilm coated high power RF, microwave, or millimeter wave energy device component, wherein a secondary electron emission (SEE) coefficient of the multipactor inhibiting carbon nanofilm is less than a SEE coefficient of an underlying surface of the component, the method comprising the steps of:

exposing a multipactor-inhibiting carbon nanofilm coated surface of the component to a vacuum environment; and exposing the multipactor-inhibiting carbon nanofilm coated surface of the component to high power RF energy in the vacuum environment.

76. The method of claim 75, wherein the component is a waveguide having at least one multipactor-inhibiting carbon nanofilm coated surface defining at least one cavity, wherein the method further comprises the steps of:

exposing the multipactor-inhibiting carbon nanofilm coated surface of the waveguide to the vacuum environment; and passing high power RF energy through the cavity.

77. The method of claim 76, wherein the waveguide is a diplexer.

78. The method of claim 76, wherein the waveguide is an output multiplexer.

79. The method of claim 75, wherein the component is an RF window, and wherein the method further comprises the steps of:

separating the vacuum environment from a surrounding environment using the RF window; and passing high power RF energy through the RF window.

80. The method of claim 79, wherein the RF window is provided to a klystron, an inductive output tube, a linear accelerator, an RF amplifier, a UHF television transmitter, a particle accelerator, a radiotherapy device, an ion accelerator, a plasma device, an RF transmitter, RF communication equipment or a high power RF device.

81. The method of claim 75, wherein the multipactor inhibiting carbon nanofilm includes graphene.

82. The method of claim 81, wherein the graphene includes a plurality of parallel $sp^2$ hybridized carbon sheets.

83. The method of claim 75, wherein the SEE coefficient of the multipactor inhibiting carbon nanofilm is less than a SEE coefficient of conventional multipactor-inhibiting TiN coatings.

84. The method of claim 75, wherein a thickness of the multipactor inhibiting carbon nanofilm is between 0.142 nm and 14.2 nm thick.

85. The method of claim 75, wherein the carbon nanofilm includes Electron Beam Deposited Carbonaceous Layers (EBDCL).

86. An apparatus for high power RF, microwave, or millimeter wave transmission, comprising:

a high power RF energy source inside a vacuum environment; and a multipactor-inhibiting carbon nanofilm coated component exposed to the vacuum environment, wherein a secondary electron emission (SEE) coefficient of the multipactor inhibiting carbon nanofilm is less than a SEE coefficient of an underlying surface of the component.

87. The apparatus of claim 86, wherein the component is a waveguide having a cavity for guiding high power RF energy from the high power RF energy source therethrough, wherein a surface of the waveguide defining the cavity has the multipactor-inhibiting carbon nanofilm thereon.

88. The apparatus of claim 87, wherein the waveguide is a diplexer.

89. The apparatus of claim 87, wherein the waveguide is an output multiplexer.

90. The apparatus of claim 86, wherein the component is an RF window separating the vacuum environment from a surrounding environment, wherein the surface of the RF window facing the vacuum environment has the multipactor-inhibiting carbon nanofilm thereon.

91. The apparatus of claim 90, wherein the apparatus is a klystron, an inductive output tube, a linear accelerator, an RF amplifier, a UHF television transmitter, a particle accelerator, a radiotherapy device, an ion accelerator, a plasma device, an RF transmitter, RF communication equipment or a high power RF device.

92. The apparatus of claim 86, wherein the multipactor inhibiting carbon nanofilm includes graphene.

93. The apparatus of claim 92, wherein the graphene includes a plurality of parallel $sp^2$ hybridized carbon sheets.

94. The apparatus of claim 86, wherein the SEE coefficient of the multipactor inhibiting carbon nanofilm is less than a SEE coefficient of conventional multipactor-inhibiting TiN coatings.

95. The apparatus of claim 86, wherein a thickness of the multipactor inhibiting carbon nanofilm is between 0.142 nm and 14.2 nm thick.

96. The apparatus of claim 86, wherein the carbon nanofilm includes Electron Beam Deposited Carbonaceous Layers (EBDCL).

97. A component that is exposed to a plasma environment where the component includes:

a multipactor-inhibiting carbon nanofilm covering at least one surface of the component.

98. The component of claim 97, wherein the component is a component in at least one of an RF, microwave, millimeter wave, generating device.

99. The component of claim 97, wherein the component is installed in at least one of a plasma generated RF source, a plasma generated microwave source or a plasma generated millimeter source.

100. The component of claim 97, wherein the carbon nanofilm coating is employed to provide enhanced reliability of the component.

101. An RF window, comprising:

a plate of material transparent to electromagnetic energy across one band; and a graphene layer on at least one surface of the plate in a thickness so as to reduce the transmission of electromagnetic energy through the RF window at another band.

102. A multilayer RF window, comprising:

a material transparent to electromagnetic energy across one band;

a graphene layer disposed on at least one surface of said material in a thickness so as to reduce the transmission of electromagnetic energy through the RF window at a second band; and a third layer that inhibits the transmission of electromagnetic energy across a third band.

* * * * *

UNITED STATES PATENT AND TRADEMARK OFFICE

CERTIFICATE OF CORRECTION

PATENT NO. : 8,970,329 B2
APPLICATION NO. : 13/339070
DATED : March 3, 2015
INVENTOR(S) : Patrick Fisher et al.

It is certified that error appears in the above-identified patent and that said Letters Patent is hereby corrected as shown below:

In the Claims

Column 17, Line 37, Claim 20, after "method" insert -- of --

Column 19, Line 48, Claim 66, delete "fowled" and insert -- formed --

Signed and Sealed this
Sixteenth Day of June, 2015

Michelle K. Lee
*Director of the United States Patent and Trademark Office*